July 11, 1939.   A. H. GAEBEL ET AL   2,165,965
RETOUCHING AND STRIPPING FRAME
Filed March 9, 1937   2 Sheets-Sheet 1

INVENTORS
Arthur H. Gaebel
and Arnold K. Hansen
BY
ATTORNEYS

July 11, 1939.　　　A. H. GAEBEL ET AL　　　2,165,965
RETOUCHING AND STRIPPING FRAME
Filed March 9, 1937　　　2 Sheets-Sheet 2
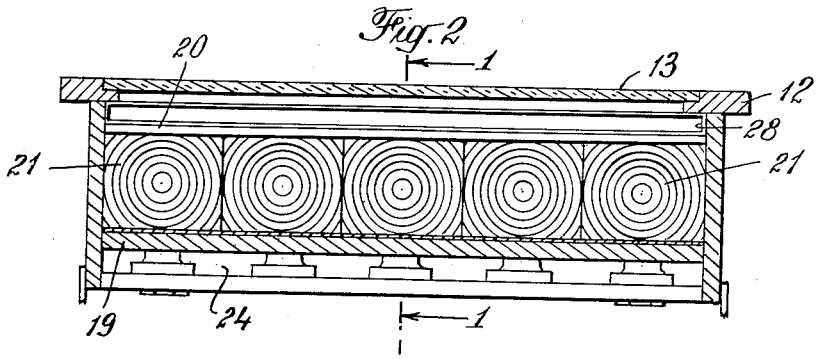
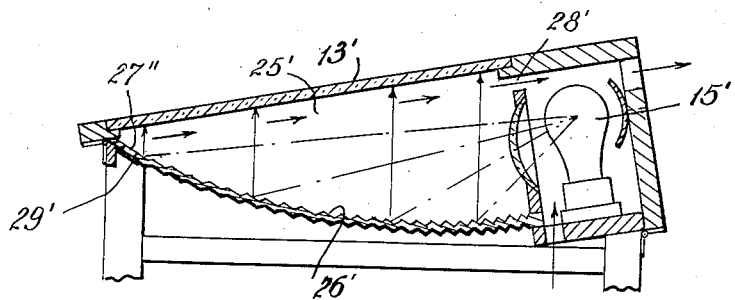
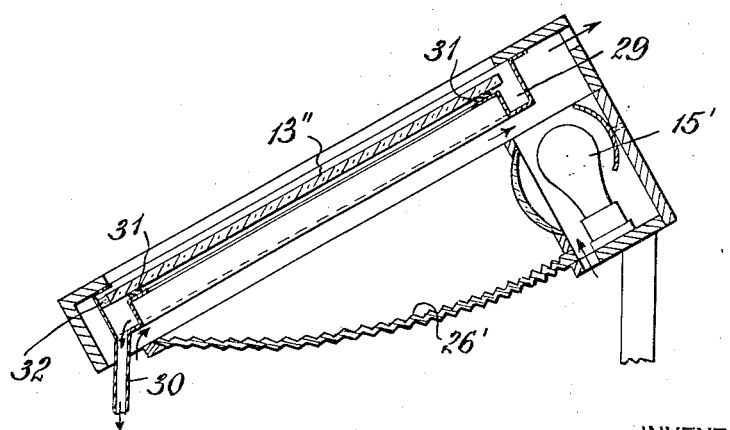
INVENTORS
Arthur H. Gaebel
and Arnold R. Hansen
BY
ATTORNEYS Patented July 11, 1939

2,165,965

UNITED STATES PATENT OFFICE 2,165,965

RETOUCHING AND STRIPPING FRAME

Arthur H. Gaebel, Larchmont, N. Y., and Arnold K. Hansen, Alexandria, Va.; said Hansen assignor to said Gaebel Application March 9, 1937, Serial No. 129,778

10 Claims. (Cl. 95—102)

This invention relates to retouching and stripping frames and has particular reference to frames for photographic retouching, lithographic stripping and the like, and having a ground glass screen on which the work is adapted to be mounted and which is illuminated from the rear.

Stripping and retouching frames of the type mentioned are usually illuminated by the direct light of one or more incandescent lamps located within a chamber immediately behind the glass screen, so that glare and uneven illumination results and the screen becomes uncomfortably hot. In an effort to minimize these objections, the chamber is made large and deep and the lamps located as far from the screen as possible, with the result that a large and cumbersome apparatus is provided which still has the same objections.

In accordance with the present invention, a retouching and stripping frame is provided in which the screen is uniformly illuminated over its entire area without glare, is not subject to heating, and is compact and readily adapted to use in all desired positions for photographic retouching and lithographic stripping work and the like.

More particularly, the frame of this invention comprises a ground glass screen having a widely-curved reflector behind it, which may be either smooth-surfaced or provided with small parallel reflecting surfaces of varying angles. A source of light is positioned beyond the borders of the screen and so cooperates with the curved reflector as to uniformly illuminate the screen without glare, the curvature of the reflector being such as to reflect the remote rays of light as efficiently as it reflects those falling thereon adjacent the light source, despite the fact that the source of light is spaced the entire width of the screen from the remote surfaces of the reflector. The light distribution to the reflector is preferably aided by diffusing lenses.

The position of the source of light, such as a series of incandescent lamps, outside of the perimeter of the screen reduces heating thereof, but what is more effective is the induction of a flow of cooling air through the space between the screen and the reflector by means of the heat emitted by the lamps, so that the screen is maintained cool at all times. Other improvements are provided which render the apparatus superior to similar devices in general use.

For a more complete understanding of the invention, reference may be had to the accompanying drawings, in which:

Fig. 2 is a transverse section through the reflecting chamber, as seen along the line 2—2 of Fig. 1;

Fig. 3 illustrates, in section, a modified form of the invention; and

Fig. 4 illustrates an adaptation of the new device to wet stripping operations.

Figure 1:
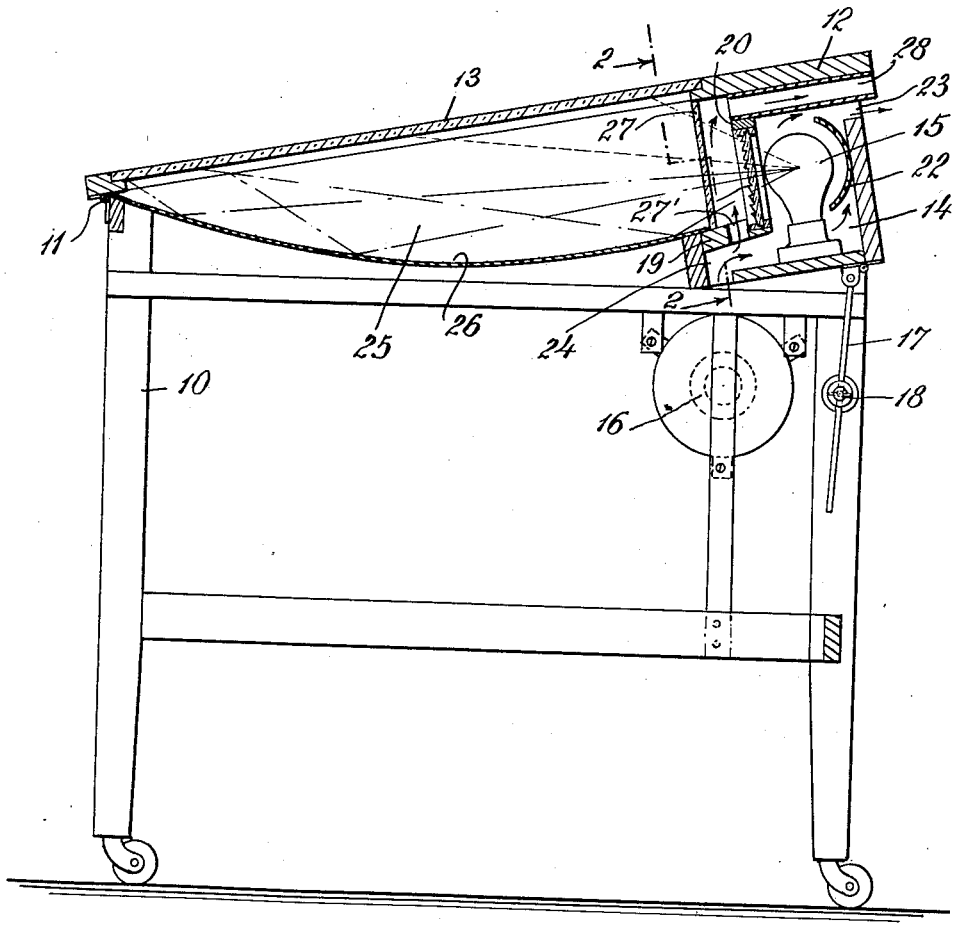
Figure 1 is a side view of the new retouching and stripping frame of this invention, with the screen and reflecting chamber illustrated in section as seen along the line 1—1 of Fig. 2.

In Fig. 1 of these drawings, numeral 10 designates a suitable support, such as a table, to the forward edge of which the frame 12 is preferably hinged at 11. The frame 12 is provided with the translucent screen 13 of ground glass or other suitable light-diffusing material, on which is adapted to be laid the sheet material to be examined, retouched, or otherwise treated.

The underside of the rear of the frame 12 is fitted with a box-like receptacle 14 containing one or more incandescent lamps 15, or other illuminating means, depending upon requirements. Depending on the size of the apparatus and the degree of illumination desired, a plurality of lamps 15 are provided, preferably connected in parallel.

The gross intensity of their illumination may be adjusted at will by manipulating the rheostat 16, in the known manner. A rod 17 depending from the frame 12 and passing through an eye on the table 10, may be locked in any adjusted position by a thumb-screw 18, whereby the angle of tilt of the screen 13 may be varied.

Suitably mounted between a lower ledge 19 and an upper strip 20 is a row of adjacent diffusing glass lenses 21, one for each lamp 15, and each consisting of concentric prismatic lenses which converge the light rays and also direct them laterally to a small extent, underneath the screen 13. The function of the lenses 21 is to direct the maximum proportion of the light upon the remote surface of the reflector 26, where it is most needed. Each lamp may be provided with a reflector 22. The lamp receptacle 14 is provided with an upper rear air outlet 23 and a lower air inlet 24.

The heat emitted by the lamps 15 causes the flow of air to be induced into inlet 24 through the receptacle 14 and out of outlet 23, whereby the heat is dissipated.

Forming a closed reflecting chamber 25 with the screen 13 and lamp receptacle 14, is a reflector 26, which is of reflecting material, preferably sheet metal painted flat white on its inner surface, plated sheet metal, or the like. This reflector 26 has the wide curvature illustrated in Fig. 1, determined by careful calculation and experiment to provide uniform reflection of the rays directed thereon by the lenses 21, so that the ground glass screen 13 is illuminated uniformly over its entire area.

In determining the proper curvature of the reflector 26, the direct light striking the rear of the screen 13 was considered. Thus for a screen 13 that is twenty-five inches from front to rear, the distance of the reflector from the rear surface thereof at a point five inches from its front edge is approximately 2¾ inches; at ten inches from the front edge of the screen, the reflector spacing is approximately 4½ inches; at fifteen inches the spacing is approximately 5½ inches; at twenty inches it is approximately 6 inches, and at the rear edge of the screen the reflector 26 is spaced approximately 5½ inches from the rear surface of the screen.

With this arrangement, the light passing through the screen 13 at its front edge is as intense as that passing therethrough adjacent its rear edge, regardless of the fact that the lamps 15 are remote from the front edge and are near the rear edge. Also, the direct light striking the screen is so balanced with the light reflected from the reflector 26, that the latter compensates for any deficiency in uniformity of the direct light, and vice versa. The paths of typical rays are indicated in Fig. 1, those representing direct light being indicated by dotted lines. The illumination of screen 13 is accordingly uniform and glareless.

In order to dissipate heat which might tend to enter the chamber 25 from the lamps 15 and thus heat the screen 13, a thin glass partition 27 is spaced from the lenses 21 forming therewith a narrow passage having a bottom air inlet opening 27' and communicating at its upper end with the outlet opening 28. Inasmuch as the heat emitted forwardly is more or less concentrated at the outer lense surfaces, a flow of cooling air is induced thereby into inlet 27' and out of outlet 28, thereby preventing heat from entering chamber 25 and keeping screen 13 cool and comfortable to work on.

A modified form of the apparatus of this invention is illustrated in Fig. 3, wherein the reflector 26' consists of a reflecting surface having a series of inverted V-shaped parallel ribs or ridges, the reflecting angles of which increase in pitch from front to rear as illustrated. With this arrangement, the exposed surfaces near the lamps 15' are smaller than those more remote therefrom, with the result that the reflection through screen 13' is uniform regardless of the fact that the lamps 15' are remote from the front edge of the screen 13'. Typical reflected rays are indicated in Fig. 3.

The modification of Fig. 3 also illustrates a different form of arrangement for dissipating heat from within chamber 25'. The forward or lower end of chamber 25' is provided with a row of air inlet openings 27'', conveniently located in the reflector 26', and with the upper or rear outlet passage 28'. The heated air, rising, flows out of passage 28' and cool air flows into chamber 25' through inlet openings 27''. It has been found that this arrangement is not as satisfactory as that of Fig. 1 when the apparatus is employed in a dusty room, because the aforementioned air current draws dust into chamber 25, and the dust settles on the reflector 26, soon diminishing its reflectivity. This objection may be eliminated or minimized by covering the inlet holes 27'' with a light fabric or fibrous dust filter 29, which is replaceable when clogged.

Where wet stripping is to be done with the apparatus, it is preferable that the screen be sealed water-tightly from the reflection chamber. Figure 4 illustrates a preferred arrangement, in which 28 illustrates a squaring frame supporting a trough 29, provided with an outlet spout 30 and of a dimension to accommodate the glass screen 13'', which rests on rubber gaskets 31 with its edges overlapping the trough 29 so that the latter collects the drip from the screen. Spaced gaskets 32 also support the lower edge of the screen. The remainder of the apparatus is constructed as illustrated in Figs. 1 and 3.

While certain preferred embodiments of the invention have been illustrated and described herein, it is to be understood that the invention is not limited thereby but is susceptible of changes in form and detail within the scope of the appended claims.

We claim:

1. In apparatus of the character described, the combination of a translucent screen, a source of light positioned beyond the margin thereof, and a curved reflector spaced in fixed relation from the rear of said screen and forming a chamber therewith which decreases in depth from adjacent the light source to the end of the chamber remote from the light source and into which light from said source is directed, and means interposed between the chamber and the light source for directing a greater amount of light onto the reflector in the remote part of the chamber than adjacent the light source to illuminate the screen uniformly.

2. In apparatus of the character described, the combination of a translucent screen, a source of light positioned adjacent thereto, and a reflector spaced in fixed relation from the rear of said screen and forming a chamber therewith into which light from said source is directed, said reflector having a plurality of angular reflecting surfaces.

3. In apparatus of the character described, the combination of a translucent screen, a source of light positioned adjacent thereto, and a reflector spaced in fixed relation from the rear of said screen and forming a chamber therewith into which light from said source is directed, said reflector having a plurality of angular reflecting surfaces, the angles of which vary progressively.

4. In apparatus of the character described, the combination of a translucent screen, a source of light positioned adjacent thereto, and a reflector spaced in fixed relation from the rear of said screen and forming a chamber therewith into which light from said source is directed, said reflector having a plurality of substantially parallel reflecting surfaces arranged at an angle to said screen.

5. In apparatus of the character described, the combination of a translucent screen, a source of light positioned adjacent thereto, and a reflector spaced in fixed relation from the rear of said screen and forming a chamber therewith into which light from said source is directed, said reflector having a plurality of substantially parallel reflecting surfaces arranged at an angle to said screen, the angles of which increase in accordance with the distance from said light source.

6. In apparatus of the character described, the combination of a translucent screen, a source of light positioned adjacent thereto, and a reflector spaced in fixed relation from the rear of said screen and forming a chamber therewith into which light from said source is directed, and means interposed between said light source and said reflector for illuminating jointly said screen and reflector and directing a greater amount of light on the surface of the reflector remote from said light source than on the surface of the reflector nearer the light source.

7. In apparatus of the character described, the combination of a translucent screen, a source of light positioned adjacent thereto, and a reflector spaced in fixed relation from the rear of said screen and forming a chamber therewith into which light from said source is directed, and a lens interposed between said light source and reflector for directing a maximum of the light upon the remote surface of the reflector and a minimum of the light upon the near surface thereof.

8. In apparatus of the character described, the combination of a translucent screen, a source of light positioned adjacent thereto, and a reflector spaced in fixed relation from the rear of said screen and forming a chamber therewith into which light from said source is directed, and a lens interposed between said light source and reflector for directing the maximum light jointly upon the remote surfaces of the screen and reflector and the minimum light jointly upon the near surfaces of the screen and reflector.

9. In apparatus of the character described, the combination of a translucent screen, a source of light for illuminating the same, a trough beneath at least one edge of said screen for collecting drip therefrom, and a light reflector behind said screen and forming a chamber therewith in which said trough is positioned.

10. In apparatus of the character described, the combination of a translucent screen, a source of light positioned adjacent thereto, a reflector spaced from the rear of said screen and forming a chamber therewith into which light from the source is directed, a lens interposed between the source and chamber, and a transparent partition between said lens and chamber forming a narrow passage adjacent the outer face of the lens, said passage having an upper air outlet opening and a lower air inlet opening, whereby a current of cooling air is induced by the heat emitted by the source of light and dissipates the same.

ARTHUR H. GAEBEL.
ARNOLD K. HANSEN.